United States Patent [19]

Ward, III

[11] 4,064,436
[45] Dec. 20, 1977

[54] REDUCING NOISE IN URANIUM EXPLORATION

[75] Inventor: William J. Ward, III, Schenectady, N.Y.

[73] Assignee: Terradex Corporation, Walnut Creek, Calif.

[21] Appl. No.: 715,224

[22] Filed: Aug. 18, 1976

[51] Int. Cl.² ............................................. G01V 5/00
[52] U.S. Cl. ........................................ 250/253; 55/16; 250/472
[58] Field of Search ....................... 250/253, 472, 473; 55/16, 17

[56] References Cited

U.S. PATENT DOCUMENTS

| 3,274,750 | 9/1966 | Robb | 55/16 |
| 3,665,194 | 5/1972 | Alter et al. | 250/253 |

*Primary Examiner*—Davis L. Willis

*Attorney, Agent, or Firm*—Townsend and Townsend

[57] ABSTRACT

A method and apparatus are described for reducing or removing the background noise caused by thoron gas ($^{220}Rn$) in uranium exploration conducted by the detection of radon gas ($^{222}Rn$) emanating from the ground. This is accomplished by the use of a number of alpha particle detectors, each of which is disposed in a protective enclosure. A permselective membrane, which permits, but selectively retards, the passage therethrough of gases is disposed in the path to be traversed before such gases can reach the alpha particle detector. The retarding influence of the membrane should be sufficient to make the concentration of thoron inside the enclosure small relative to the concentration of thoron outside the enclosure. The influence of the membrane on radon should be negligible, i.e. the randon concentration inside and outside the enclosure should be substantially equal.

8 Claims, 2 Drawing Figures

U.S. Patent  Dec. 20, 1977  4,064,436
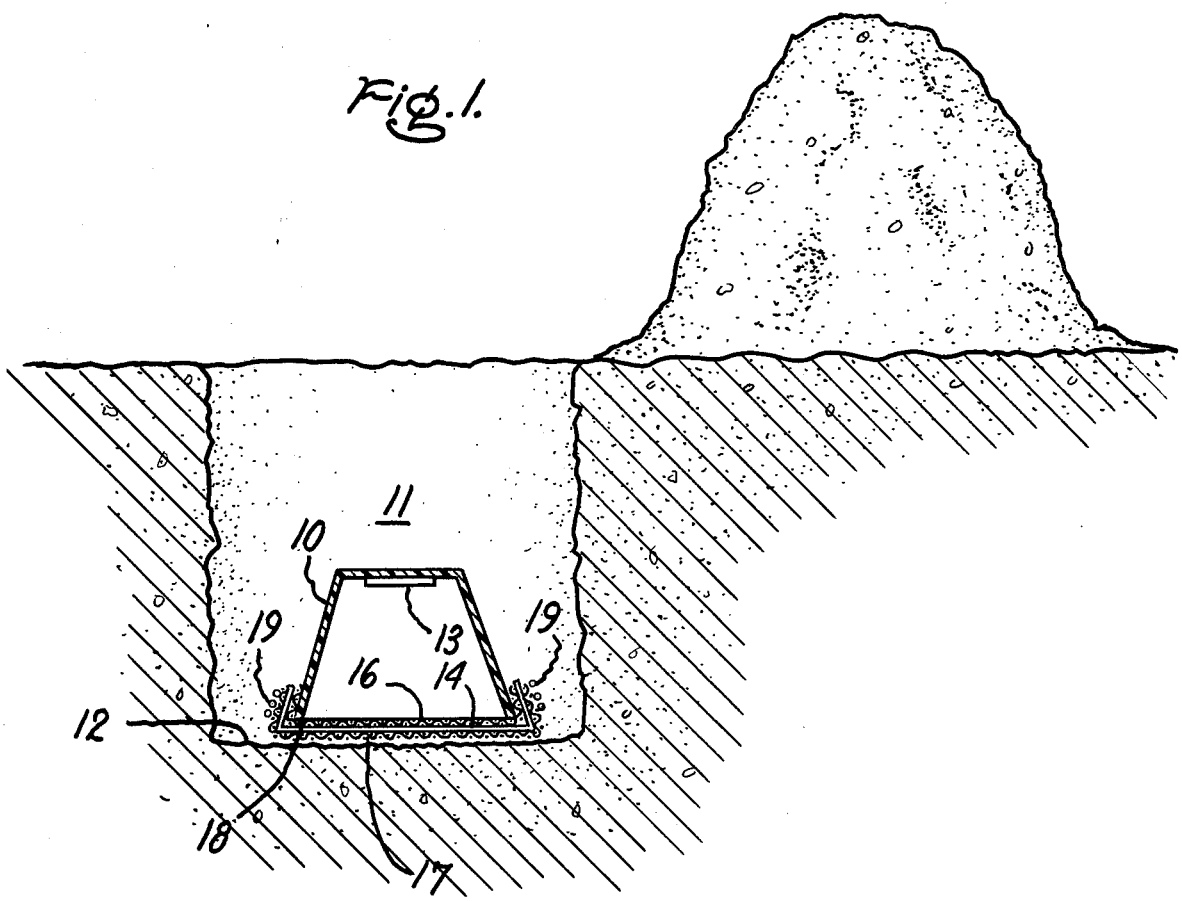

REDUCING NOISE IN URANIUM EXPLORATION

BACKGROUND OF THE INVENTION

One method and apparatus by which the presence and concentration of radon and its alpha-emitting daughters can be effectively detected and monitored is disclosed in U.S. Pat. No. 3,665,194 — Alter et al., incorporated by reference. A sheet of solid state track-registration material (the alpha particle detector) is disposed in a protective environment at a location to be checked for the emission of radon. If the track-registration material becomes irradiated by alpha particles, minute damage "tracks" are created therein, which tracks can be enlarged and made visible by contact with a reagent to which the tracks display preferential chemical reactivity.

Ordinarily this uranium exploration is carried out by burying in the earth inverted cup-shaped housings containing the track-registration material. The housings are set forth in a predetermined arrangement (e.g. a grid system) and permitted to remain for a preselected period of time (e.g. 4 weeks). Thereafter the housings and detectors are removed, the detectors are subjected to a chemical etching solution and the number of tracks etched on each detector is counted by microscopic inspection. Correlation of the results from the various housings are made in order to determine whether subsurface uranium ore is present and where.

Another method of uranium exploration substitutes an electronic solid state detector of alpha particles for the track registration material of the method described hereinabove. These electronic detectors may be used repetitively either in the same or new locations.

DESCRIPTION OF THE INVENTION

A method and apparatus are described for reducing or removing the background noise caused by thoron gas ($^{220}$Rn) in uranium exploration conducted by the detection of radon gas ($^{222}$Rn) emanating from the ground. This is accomplished by the use of a number of alpha particle detectors, each of which is disposed in a protective enclosure. A permselective membrane, which permits, but selectively retards, the passage therethrough of gases is disposed in the path to be traversed before such gases can reach the alpha particle detector. While $^{220}$Rn has a half-life of 56 seconds, $^{222}$Rn has a half-life of 3.82 days. The retarding influence of the membrane should be sufficient to make the concentration of thoron inside the enclosure small relative to the concentration of thoron outside the enclosure. The influence of the membrane on radon should be negligible, i.e. the radon concentration inside and outside the enclosure should be substantially equal.

The membrane should not in itself be a source of substantial quantities of either $^{220}$Rn or $^{222}$Rn. The material of which the membrane is made should not be soluble in water whereby it can remain stable, when in contact with soil. The enclosure, e.g. cup, should have imperforate sides and (in the inverted position) top.

BRIEF DESCRIPTION OF THE DRAWING

The subject matter of the instant invention for which protection is sought is presented as claims at the conclusion of the written description of the invention set forth herein. The description sets forth the manner and process of making and using the invention and the accompanying drawing forms part of the description for schematically illustrating the invention and the best mode.

The view shown in section in FIG. 1 schematically illustrates utilization of the instant invention in uranium exploration and FIG. 2 schematically shows in section an embodiment in which the non-porous membrane barrier is accommodated in a screw cap top for the housing.

MANNER AND PROCESS OF MAKING AND USING THE INVENTION

In order to facilitate the description of this invention reference will be made to the application thereof in the method disclosed in the aforementioned U.S. Pat. No. 3,665,194 in which a solid state track-detector is used as the alpha particle detector. This invention is equally applicable when other forms of alpha particle detector are employed.

In uranium exploration by the method described in U.S. Pat. No. 3,665,194 cup 10 would be placed in excavation 11 so as to rest on the soil 12 at the bottom thereof. Typically a board would be used to cover the hole with this in turn being covered with dirt from the excavation thereby burying cup 10. This procedure would be repeated with a number of such cups in some desired pattern, the cups remaining buried for the test period. Mounted within each cup is a piece, or sheet, 13 of alpha particle track detector material, preferably cellulose nitrate, to measure the emanation from the ground below of the gaseous radon isotopes $^{220}$Rn and $^{222}$Rn. The $^{222}$Rn gas is a decay product of uranium and, therefore, the detection of such emanations would be an indication of the presence of uranium in the earth. The other alpha particle emitting gas, $^{220}$Rn, is a decay product of thorium and, hence, tracks induced thereby in track detector 13 constitute an unwanted background signal, when uranium is being sought.

In order to reduce or remove this unwanted background caused by alpha particle emissions from thoron gas entering the mouth of cup 10, instead of permitting gases leaving the soil through surface 12 to enter directly into the internal volume of cup 10, the non-porous permselective membrane 14 is disposed between surface 12 and sheet 13 (or other alpha particle detector). The sides and top (in the inverted position) of cup 10 are imperforate in order to prevent the short-circuiting by soil gases into the cup without passing through membrane 14. Thus, any soil gases reaching the sheet of track detector material 13 must first pass through layer 14 and be subjected to the selective transit periods peculiar to each gas depending upon its particular permeation rate. A zone, or volume, at least 6.0 centimeters thick must remain in the cup between the upper surface of layer 14 and the underside of the surface of sheet 13 so that in passing through this zone of air, the alpha particles are slowed sufficiently so that they can be detected by this form of alpha particle detector.

In the arrangement in FIG. 1 membrane 14 and protective screens 16, 17 are turned over lip 18 of cup 10 and held in place as by a rubber band, wire or string 19 so that the mouth of cup 10 is closed off thereby.

The non-porous permselective barrier is typically a polymer membrane (preferably made of organopolysiloxane or a copolymer containing organosiloxane units) sufficiently impermeable to thoron so that the concentration of thoron inside the cup is a small fraction i.e. less than 20 percent, of the thoron concentration outside the cup during the test period. Also, the permeability of the membrane to the $^{222}$Rn must be great enough so that the $^{222}$Rn concentration inside enclosure 10 reaches a level, which will be a large fraction of the concentration of $^{222}$Rn outside enclosure 10. Preferably the concentration of $^{222}$Rn inside the enclosure 10 will be 90% (by volume) or more of the concentration of the $^{222}$Rn outside the enclosure. Silicone rubber non-porous membranes in the thickness range 2–12 mils and silicone/polycarbonate copolymer non-porous membranes (55% silicone by weight) in the thickness range 1–5 mils are examples of non-porous polymer membranes fulfilling these requirements.

Membranes in the thickness range required can be made by solvent casting upon a flat surface employing a doctor blade with the blade setting adjusted so that, after evaporation of the solvent, the proper thickness non-porous membrane will remain. Materials useable in solvent casting organopolysiloxanepolycarbonate membranes are described in U.S. Pat. No. 3,874,986 — Browall et al. Another method that may be employed for silicone rubber (including both filled and unfilled organopolysiloxanes) non-porous membrane is described in U.S. Pat. No. 3,325,330 — Robb, incorporated by reference as to materials and processes. In all instances the materials of which these membranes are made should not contain impurities such as will emit significant amounts of either $^{220}$Rn or $^{222}$Rn gas.

Thus, in a mixture of soil gases containing $^{220}$Rn and $^{222}$Rn, the $^{220}$Rn and $^{222}$Rn in encountering membrane 14 in the attempt to enter enclosure 10 will pass through the membrane at flow rates depending upon the particular permeation rates of each gas in the given membrane. The mechanism involved in the permeation is not a simple diffusion process as occurs in the passage of gases through porous materials. Instead each gas dissolves in the membrane on the side having the high partial pressure of the gas, diffuses through the membrane and comes out of solution on the opposite side where the partial pressure of the gas is lower. In a gas mixture, each component acts independently of the other(s). Thus, the permeability of a given gas is a product of both the diffusion coefficient of the gas in the specific membrane and the solubility of the gas in the specific membrane. The permeability constants for many gas/membrane combinations have been determined and reported in the literature.

The protective screens 16, 17 are preferably woven polymer (e.g. polyester or nylon monofilament) screen cloth having mesh openings in the range of 400 microns to about 1200 microns and an open area ranging from about 45 to 55 percent.

It has been found that by selecting the nature of the membrane material to be employed and the thickness of the membrane in accordance with the guidelines given herein, the $^{220}$Rn signal reaching within 6.0 cm of detector 13 (the active air space) can be reduced as desired without materially affecting the $^{222}$Rn signal.

Tests were made using a non-porous copolymer membrane (55% by wt. dimethyl-siloxane, 45% by wt. polycarbonate) $50 \cdot 10^{-4}$ cm (about 2 mils) thick.

In the first set of tests a pair of substantially identical (equal mass) sources of $^{220}$Rn (i.e. thorium oxide lantern mantles) were used. One source was placed in a first closed space in direct flow communication with the open underside of a cup 10 (with detector 13 mounted therein) and the second source was placed in a second closed space in direct flow communication with the $50 \cdot 10^{-4}$ cm membrane referred to hereinabove covering the mouth of a cup 10 (with detector 13 mounted therein) so that gases entering the active air space in cup 10 first had to traverse the membrane. After a 5 day exposure, the ratio of the alpha tracks in the case of the open cup 10 to the tracks in the case of the cup 10 having the membrane covering was 8.25 ($\pm 0.97$). This readout indicated that about 88% of the $^{220}$Rn signal was removed by the delay in transit time caused by the membrane.

In the second set of tests a pair of substantially identical (equal mass) sources of $^{222}$Rn (i.e. uranium ore) were used. One source was placed in a first closed volume in direct flow communication with the open underside of a cup 10 (with detector 13 mounted therein) and the second source was placed in a second closed space in direct flow communication with the $50 \cdot 10^{-4}$ cm membrane referred to hereinabove covering the mouth of a cup 10 (with detector 13 mounted therein) so that gases entering the active air space in cup 10 first had to pass through the membrane. After a five-day exposure, the ratio of the alpha tracks in the case of the open cup 10 to the tracks in the case of the cup 10 having the membrane covering was 0.910 ($\pm .055$). This indicated that the barrier (membrane 14) did not significantly or measurably reduce the penetration of the longer lived $^{222}$Rn.

The strength of the two sources used in each instance (i.e. each pair) were not appreciably different, when measured with a scintilometer. Results for the $^{222}$Rn yielding a ratio of less than 1.0 can be due merely to a two standard deviation fluctuation or due to a slight, but undetected difference in the source strength of the two $^{222}$Rn sources.

The conduct of gas permeation tests with separate gases in the same membrane system is common practice in the art of gas separation by the use of membranes. It is well known that the results obtained in this manner will also be obtained, when the same membrane system is subjected to a mixture of these same gases. Thus, it has been demonstrated that by the use of the instant invention the $^{220}$Rn signal can be greatly reduced without significantly affecting the $^{222}$Rn signal. The degree of reduction of the $^{220}$Rn signal can be varied by selecting the proper thickness for membrane 14. By doubling or tripling the thickness of the $50 \cdot 10^{-4}$ cm thick copolymer membrane used in the aforementioned tests a reduction of about 98.5% or about 99.8%, respectively, can be expected.

In addition to reducing or virtually eliminating the $^{220}$Rn background, the non-porous membrane barrier will prevent the flow of liquid water into the cup or other form of enclosure.

This invention, in addition to having the utility described hereinabove with respect to uranium exploration, can also be advantageously utilized in thorium exploration. Thus, if readings are first made with the usual arrangement described hereinabove, and then measurements are repeated using the intervening non-porous membrane according to this invention, the differences, if any, recorded between the first and second sets of readings will supply the requisite information on the $^{220}$Rn levels and, therefore, indicate the presence or absence of thorium.

BEST MODE CONTEMPLATED

An arrangement as shown in FIG. 2 shows a preferred way of disposing the membrane 14 at the mouth of enclosure 20 having imperforate wall and top area as shown. The membrane and protective plastic screen 17 are held in place by screw cap 22 having open center area 21 exposing screen and membrane area. The silicone/polycarbonate copolymer membrane described above would be used in a thickness of about 4 mils and detector 13 would be a sheet of cellulose nitrate.

Since both radon and thoron decay at rates too rapid to conveniently evaluate the diffusivity of either of these gases in permselective membrane material the mechanism responsible for the reduction of thoron concentration in the cup volume cannot be known with certainty. There are two apparent possibilities. The first mechanism is for the thoron to be resident in the membrane for a sufficiently long time (several half-lives) so that most of it decays in the membrane. This mechanism depends only upon the diffusion coefficient of thoron in the particular membrane and the thickness of the membrane. The second mechanism is for the permeability of the membrane to thoron to be such that the concentration of thoron inside the cup is small relative to the concentration of thoron outside the cup. This mechanism depends upon the permeability, area and thickness of the membrane with the permeability in turn being the product of the diffusion coefficient and the solubility of thoron in the membrane. The effectiveness of a given membrane can be routinely determined as described herein.

What I claim as new and desire to secure by Letters Patent of the United States is:

1. Radon detection apparatus for uraniumore prospecting comprising in combination:
   an imperforated protective housing defining an enclosed volume and having an opening therein, said housing being adapted for burial in the earth with said opening disposed at the underside thereof,
   a body of alpha particle detection material disposed within said housing and secured thereto for exposure to irradiation by alpha particles from soil gases entering said enclosed volume through said opening and
   a non-porous permselective membrane so disposed between said body and the soil that soil gases leaving the soil and entering said housing must enter, traverse the thickness of and leave said membrane, said membrane being substantially free of content emitting either $^{220}$Rn or $^{222}$Rn.

2. The improvement recited in claim 1 wherein the material of which the membrane is made is selected from the group consisting of organopolysiloxanes and copolymers containing organopolysiloxane units.

3. The improvement recited in claim 2 wherein the material is silicon rubber in the thickness range from about 2 to about 12 mils.

4. The improvement recited in claim 2 wherein the material is organopolysiloxane-polycarbonate copolymer in the thickness range from about 1 to about 5 mils.

5. The improvement recited in claim 1 wherein a protective porous support is provided for the membrane.

6. The improvement recited in claim 5 wherein the porous support is a woven plastic screen.

7. The improvement recited in claim 1 wherein the membrane closes off the opening.

8. The improvement recited in claim 7 wherein the membrane is held in place by a screw cap removably interconnectable with the housing.

* * * * *